United States Patent
Chiao

(10) Patent No.: US 10,563,102 B2
(45) Date of Patent: Feb. 18, 2020

(54) WASH DURABLE COLD APPLY ADHESIVE FOR APPAREL LABELING AND EMBELLISHMENT

(71) Applicant: Avery Dennison Corporation, Pasadena, CA (US)

(72) Inventor: Yi-Hung Chiao, Temple City, CA (US)

(73) Assignee: AVERY DENNISON RETAIL INFORMATION SERVICES LLC, Mentor, OH (US)

(*) Notice: Subject to any disclaimer, the term of this patent is extended or adjusted under 35 U.S.C. 154(b) by 0 days.

(21) Appl. No.: 13/803,224

(22) Filed: Mar. 14, 2013

(65) Prior Publication Data

US 2014/0120321 A1    May 1, 2014

Related U.S. Application Data

(60) Provisional application No. 61/720,425, filed on Oct. 31, 2012.

(51) Int. Cl.
| | |
|---|---|
| *C09J 133/14* | (2006.01) |
| *B32B 7/12* | (2006.01) |
| *C09J 133/10* | (2006.01) |
| *G09F 3/02* | (2006.01) |

(52) U.S. Cl.
CPC .............. *C09J 133/14* (2013.01); *B32B 7/12* (2013.01); *C09J 133/10* (2013.01); *G09F 3/02* (2013.01); *Y10T 428/2481* (2015.01); *Y10T 428/24628* (2015.01); *Y10T 428/249921* (2015.04)

(58) Field of Classification Search
CPC .. C09J 133/064; C09J 133/066; C09J 133/10; C09J 133/14; G09F 2003/0282
USPC ........................................................ 525/123
See application file for complete search history.

(56) References Cited

U.S. PATENT DOCUMENTS

| | | | |
|---|---|---|---|
| 5,648,424 | A | 7/1997 | Everaerts et al. |
| 6,884,837 | B2 | 4/2005 | Kohlhammer |
| 7,462,390 | B2 | 12/2008 | Kim |
| 7,652,103 | B2 | 1/2010 | Kavanagh |
| 7,714,076 | B2 | 5/2010 | Krepski |
| 8,148,471 | B2 | 4/2012 | Kavanagh |

(Continued)

FOREIGN PATENT DOCUMENTS

| | | |
|---|---|---|
| CN | 1073962 | 7/1993 |
| CN | 102260472 | 11/2011 |

(Continued)

OTHER PUBLICATIONS

International Preliminary Report on Patentability and Written Opinion dated May 5, 2015 for International Application No. PCT/US2013/031161.

(Continued)

*Primary Examiner* — Michael M Dollinger
(74) *Attorney, Agent, or Firm* — Avery Dennison Retail Information Services LLC

(57) ABSTRACT

A pressure sensitive adhesive composition, comprising a first acrylic resin having from 1% to 10% by weight of an ethylenically unsaturated monomer having a hydroxy substituent; a second acrylic resin having from 1% to 10% by weight of an ethylenically unsaturated monomer having an acidic carboxyl group; a polyisocyanate crosslinking agent; and a polyaziridine crosslinking agent or a polyepoxy crosslinking agent.

12 Claims, 8 Drawing Sheets

(56) References Cited

U.S. PATENT DOCUMENTS

| | | |
|---|---|---|
| 8,263,711 B2 | 9/2012 | Krepski |
| 2003/0087159 A1* | 5/2003 | Jung et al. ............... 429/303 |
| 2003/0104283 A1* | 6/2003 | Yamaguchi et al. ......... 429/303 |
| 2007/0149715 A1 | 6/2007 | Lee |
| 2009/0163626 A1* | 6/2009 | Ukei et al. ............... 524/99 |
| 2010/0227969 A1 | 9/2010 | Zhu |
| 2010/0297368 A1 | 11/2010 | Park |
| 2011/0032455 A1 | 2/2011 | Kim |
| 2011/0054115 A1 | 3/2011 | Erdogan |
| 2011/0122343 A1 | 5/2011 | Park |
| 2011/0124797 A1 | 5/2011 | Kavanagh |
| 2011/0152445 A1 | 6/2011 | Krepski |
| 2011/0206917 A1* | 8/2011 | Niimi et al. ............... 428/216 |
| 2011/0236605 A1 | 9/2011 | Hattori |
| 2012/0121897 A1 | 5/2012 | Kim |

FOREIGN PATENT DOCUMENTS

| | | |
|---|---|---|
| CN | 102268230 | 12/2011 |
| JP | H10330722 | 12/1998 |

OTHER PUBLICATIONS

International Search Report dated Jul. 18, 2013 for International Application No. PCT/US2013/031161.
Database WPI Week 199909 Thomson Scientific, London, GB; AN 1999-101333, XP002699308.

\* cited by examiner

WASH DURABLE COLD APPLY ADHESIVE FOR APPAREL LABELING AND EMBELLISHMENT

CROSS-REFERENCE TO RELATED APPLICATION

The present application claims the benefit of U.S. Provisional Patent Application No. 61/720,425 filed Oct. 31, 2012, which is incorporated herein by reference in its entirety.

BACKGROUND

This invention relates generally to crosslinkable adhesive formulations.

The following commonly assigned patent documents are incorporated by reference:

U.S. Patent Publication 2011/0289647, assigned to Avery Dennison Corporation, published Dec. 1, 2011; and U.S. Pat. No. 7,309,731, assigned to Avery Dennison Corporation, issued Dec. 18, 2007.

SUMMARY

Various exemplary embodiments disclosed herein relate to crosslinkable pressure-sensitive adhesives for binding labels, embellishments, etc. onto apparel surfaces such as cloth or fabrics; and to laminates or decorated products prepared by bonding a first layer of a label or embellishment to a second layer of fabric or other object surfaces using such a crosslinkable pressure-sensitive adhesive. The embodiments herein relate specifically to labels and embellishments such as for use with heat sensitive or fabrics that are difficult to label or provide embellishments or decorative effects.

Various exemplary embodiments disclosed herein relate to a pressure sensitive adhesive composition, comprising:

(A) from about 10 parts by weight to about 100 parts by weight of a first acrylic resin having from about 1% to about 10% by weight of the first acrylic resin of an ethylenically unsaturated monomer having a hydroxy substituent, e.g., hydroxyethyl acrylate;

(B) from about 0 parts by weight to about 90 parts by weight of a second acrylic resin having from about 1% to about 10% by weight of the second acrylic resin of an ethylenically unsaturated monomer having a carboxyl group, e.g., acrylic acid, wherein the parts by weight are based on the total weight of the first acrylic resin and the second acrylic resin in the composition, (C) a polyisocyanate crosslinking agent; and (D) a polyaziridine crosslinking agent or a polyepoxy crosslinking agent.

In various embodiments, the crosslinkable pressure-sensitive adhesive comprises from about 10 parts by weight to about 90 parts by weight of the first acrylic resin; and from about 10 parts by weight to about 90 parts by weight of the second acrylic resin. The amounts of the first and second acrylic resins are adjusted so that the adhesive contains the ethylenically unsaturated monomer having a hydroxy substituent and the ethylenically unsaturated monomer having the carboxyl group in a ratio of about 10:1 to about 0.5:1, about 5:1 to about 1:1, or about 3:1 to about 1:1. The adhesive may contain the ethylenically unsaturated monomer having a hydroxy substituent and the ethylenically unsaturated monomer having the carboxyl group in a ratio of about 2:1.

In various embodiments, the ethylenically unsaturated monomer having a carboxyl group is selected from the group consisting of an ethylenically unsaturated monocarboxylic acid, an ethylenically unsaturated dicarboxylic acid, an ethylenically unsaturated anhydride of a dicarboxylic acid, an alkyl monoester of an ethylenically unsaturated dicarboxylic acid, and mixtures thereof. The ethylenically unsaturated monomer having the carboxyl group may be acrylic acid, methacrylic acid, itaconic acid, crotonic acid, maleic acid, fumaric acid, salts thereof, or mixtures thereof.

In some embodiments, the crosslinkable adhesives comprises at least one first polymer containing a first ethylenically unsaturated monomer selected from the group consisting of an alkyl ester of acrylic acid, an alkyl ester of methacrylic acid, an ester of a carboxylic acid and an unsaturated alcohol and mixtures thereof; an optional second ethylenically unsaturated monomer selected from the group consisting of an olefin monomer, a vinylaromatic monomer and mixtures thereof; and from about 1% to about 10% by weight of the at least one polymer of a polar monomer having a reactive group. In various embodiments, the polar monomer having a reactive group is selected from the group consisting of a monomer of formula I and a mixture of the monomer of formula I and a monomer of formula II:

$$H_2C=CH-L^1-OH \qquad\qquad I$$

$$H_2C=CH-L^2-CO_2H \qquad\qquad II$$

wherein $L_1$ and $L_2$ are independently selected from the group consisting of a direct bond and an alkylene group of formula $-(CH_2)_m-[X-(CH_2)_n]_o-$;

X is absent or is a group selected from the group consisting of $-CHR-$, $-O-$, $-S-$, $-CO_2-$, $-CO-$, $-CONH-$, $-NHCO-$, and $-NHCO_2-$;

m is selected from the group consisting of 0, 1, 2, 3, and 4;

n is selected from the group consisting of 0, 1, 2, 3, and 4; and o is from 0 to 10.

In various embodiments, the crosslinkable adhesive contains a first multifunctional crosslinking agent having at least two epoxide rings, at least two aziridine rings, or at least one epoxide ring and at least one aziridine ring; and a second multifunctional crosslinking agent having at least two isocyanate groups.

In various embodiments, the crosslinkable adhesive comprises a first polymer which is a reaction product of the first ethylenically unsaturated monomer; the optional second ethylenically unsaturated monomer; and the monomer of formula I; and a second polymer which is a reaction product of the first ethylenically unsaturated monomer; the optional second ethylenically unsaturated monomer; and the monomer of formula II. The monomer of formula I may be a hydroxyalkyl acrylate monomer, vinyl alcohol, or allyl alcohol. The monomer of formula II may be acrylic acid or methacrylic acid.

In some embodiments, the crosslinkable pressure-sensitive adhesive includes a first multifunctional crosslinking agent which is an ester of a polyhydroxy compound and 3-(2-methyl-1-aziridine)propionic acid, such as a triester of pentaerithritol or trimethylolpropane and 3-(2-methyl-1-aziridine)propionic acid. In certain embodiments, the first multifunctional crosslinking agent is an ester of a polyhydroxy compound and 3-(2-methyl-1-aziridine)propionic acid, 1,1'-(1,3-phenylenedicarbonyl)bis[2-methyl aziridine]; 2,2,4-trimethyladipoyl bis[2-ethyl aziridine], 1,1'-azelaoyl bis[2-methyl aziridine], or a mixture thereof.

The crosslinkable pressure-sensitive adhesive also contains a diisocyanate, a triisocyanate, or a polyisocyanate as a second crosslinking agent. The second crosslinking agent may be an isocyanate-terminated oligomer of a diisocyanate and a dihydroxy compound or a diamine compound, where the oligomer contains from 2 to 10 diisocyanate-derived moieties. In some embodiments, the oligomer contains from 3 to 5 diisocyanate moieties. In some embodiments, the second multifunctional crosslinking agent is selected from the group consisting of toluene diisocyanate, bis(4-isocyanato phenyl)methane, bis (4-isocyanato hexyl)methane, hexamethylene diisocyanate, tetramethylene diisocyanate, oligomers thereof, and mixtures thereof.

In various embodiments, the crosslinkable pressure-sensitive adhesive contains the at least one first polymer containing from about 1% to about 10% by weight of a mixture of the monomer of formula I and the monomer of formula II; where the monomer of formula I and the monomer of formula II are present in the at least one polymer in a ratio of about 10:1 to about 0.5:1. In various embodiments, the monomer of formula I and the monomer of formula II are present in the at least one polymer in a ratio of about 5:1 to about 1:1. In some embodiments, the monomer of formula I and the monomer of formula II are present in the at least one polymer in a ratio of about 3:1 to about 1:1. In certain embodiments, the monomer of formula I and the monomer of formula II are present in the at least one polymer in a ratio of about 2:1.

In various embodiments, the first multifunctional crosslinking agent and the second multifunctional crosslinking agent are used in a ratio ranging from about 100:1 to about 0.1:1. The first multifunctional crosslinking agent and the second multifunctional crosslinking agent may be used in a ratio of ranging from about 40:1 to about 0.5:1. In some embodiments, the first multifunctional crosslinking agent and the second multifunctional crosslinking agent are used in a ratio of about 25:1 to about 0.1:1. The first multifunctional crosslinking agent and the second multifunctional crosslinking agent may be used in a ratio of about 13:1 to about 0.2:1.

In light of the present need for improved washable adhesives for binding labels and embellishments to apparel fabrics including apparel fabrics that are heat sensitive or which can be difficult to label and/or embellish or provide decorative effects to, a brief summary of various exemplary embodiments is presented. There is also a need in the market for an improved washable adhesive for use in a label and embellishment that does not leave a heat mark or "halo" (e.g. dark area around where the decorative effect or embellishment is applied) when applied to a fabric. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

BRIEF DESCRIPTION OF THE DRAWINGS

These and other features, aspects, and advantages of the present invention will become better understood with reference to the following description, appended claims, and accompanying drawings where:

DETAILED DESCRIPTION OF THE PREFERRED EMBODIMENTS

Figure 1A:
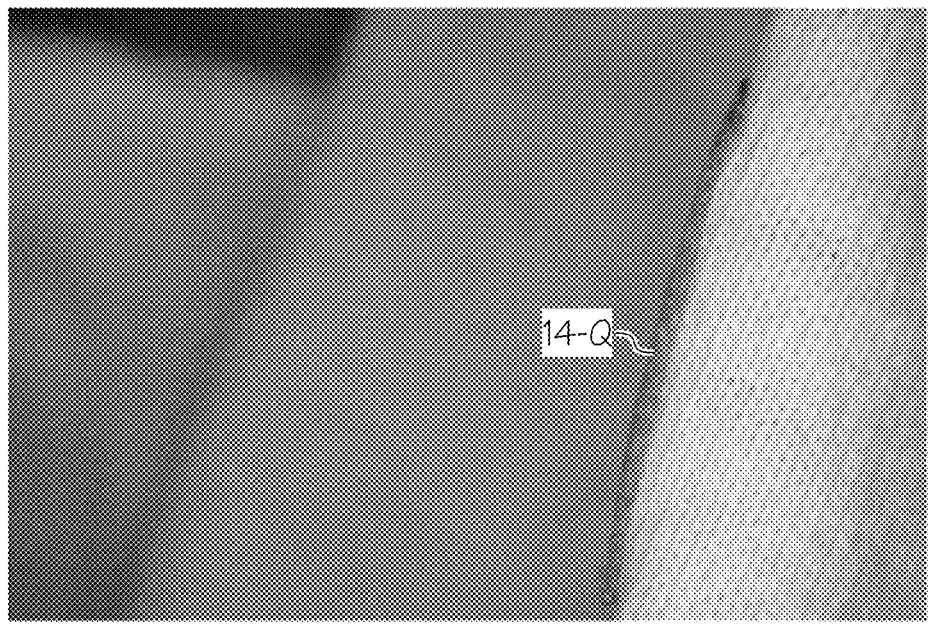
FIG. 1A is a magnified view of the effect of washing on label adhesion of Adhesive 14-Q.
Figure 1B:
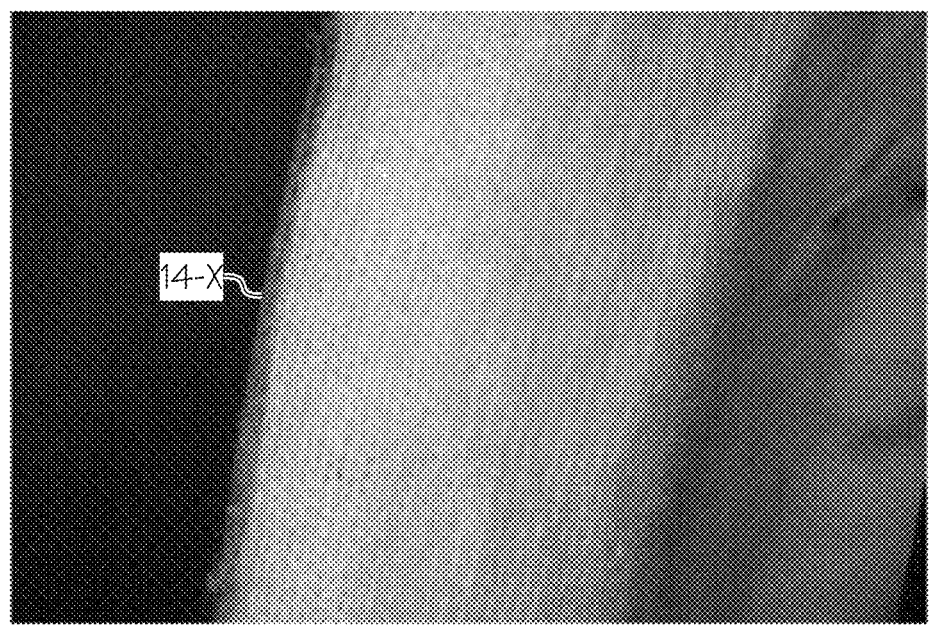
FIG. 1B is a magnified view of the effect of washing on label adhesion of Adhesive 14-X.
Figure 1C:
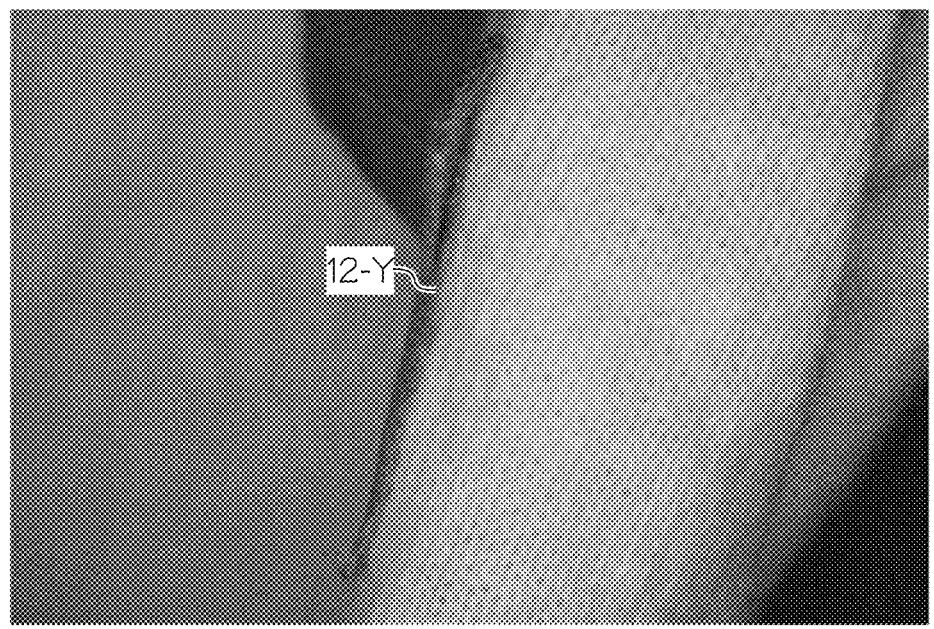
FIG. 1C is a magnified view of the effect of washing on label adhesion of Adhesive 12-Y.
Figure 1D:
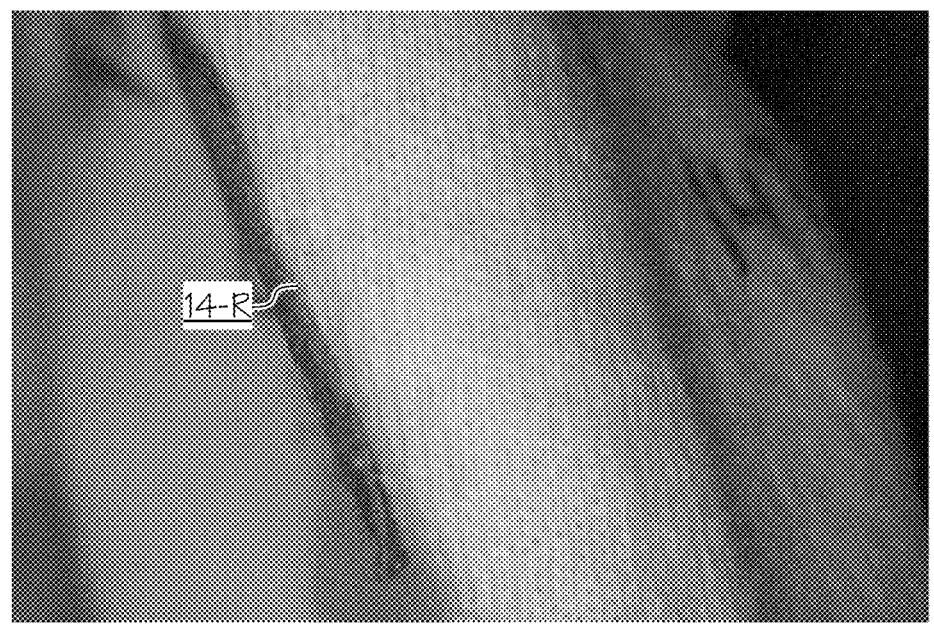
FIG. 1D is a magnified view of the effect of washing on label adhesion of Adhesive 14-R.
Figure 1E:
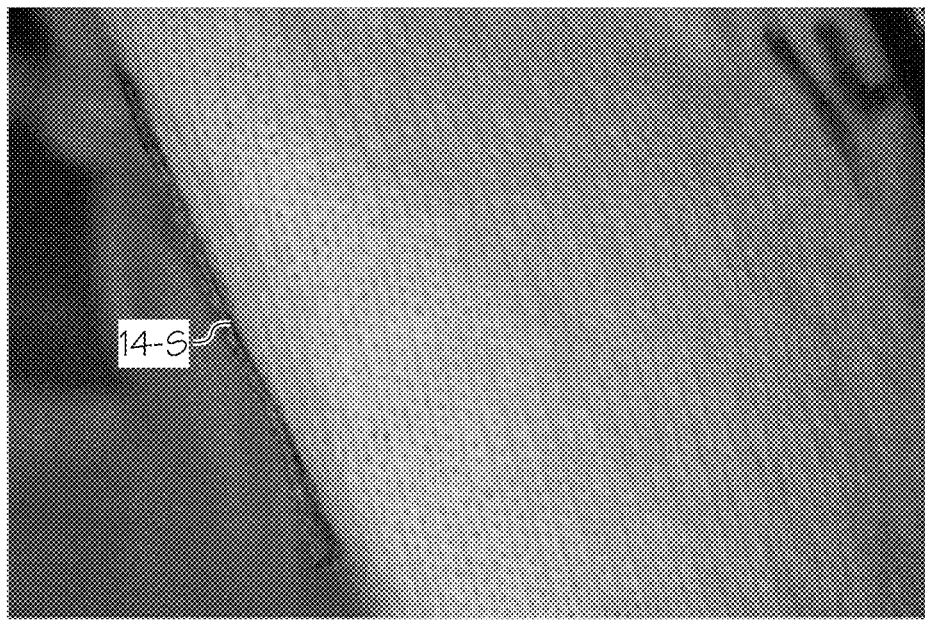
FIG. 1E is a magnified view of the effect of washing on label adhesion of Adhesive 14-S.
Figure 1F:
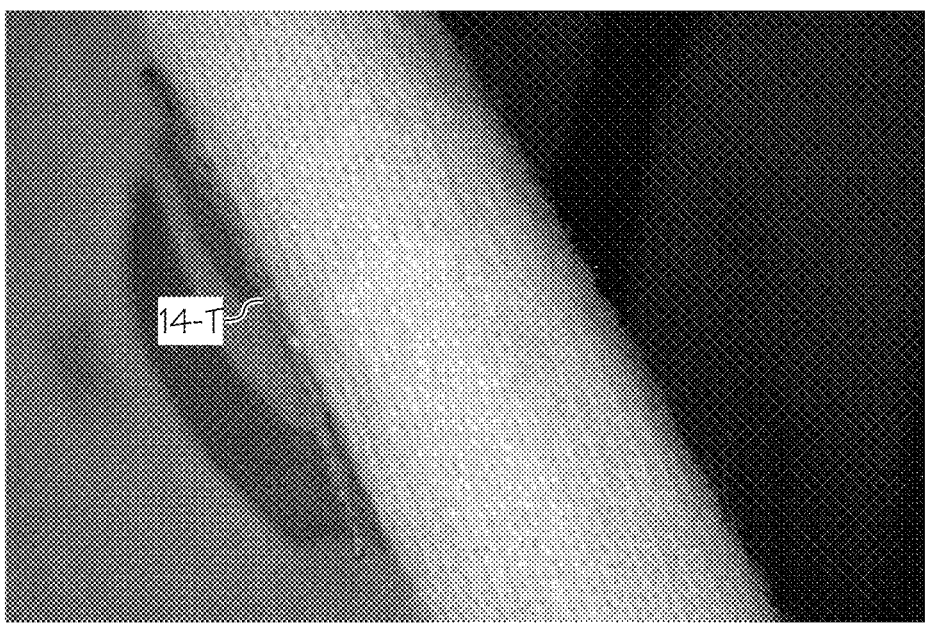
FIG. 1F is a magnified view of the effect of washing on label adhesion of Adhesive 14-T.
Figure 1G:
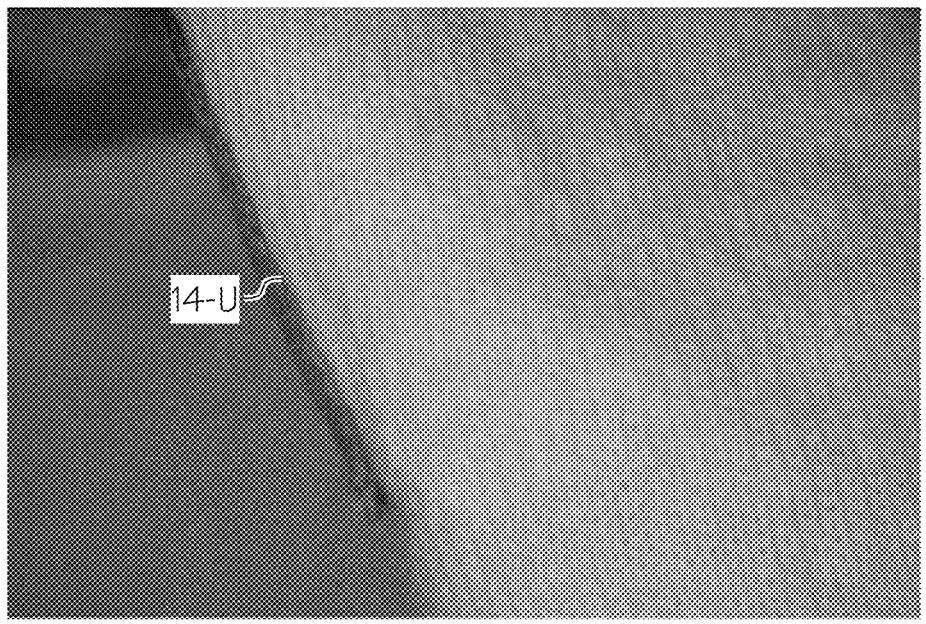
FIG. 1G is a magnified view of the effect of washing on label adhesion of Adhesive 14-U.
Figure 1H:
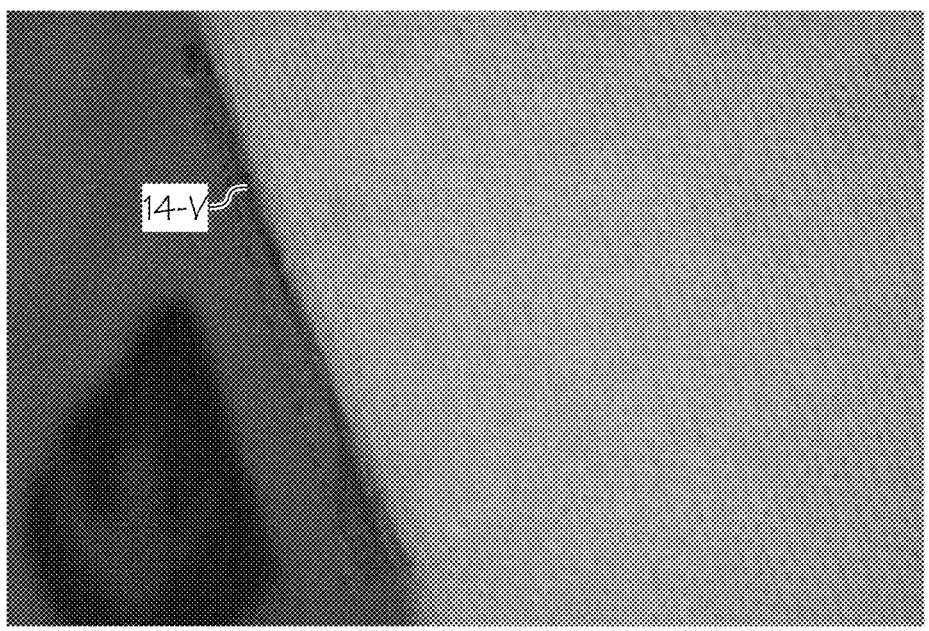
FIG. 1H is a magnified view of the effect of washing on label adhesion of Adhesive 14-V.

The current disclosure is directed to pressure-sensitive crosslinkable adhesives containing acrylic polymers having functional groups with active hydrogen atoms that may be utilized in labels, decorative effects and embellishments for fabrics. The pressure-sensitive crosslinkable adhesive disclosed in the present invention, in one embodiment, is utilized as a component of a label, decorative effect and/or embellishment for fabrics which are heat sensitive or can be difficult to label. The present invention does not leave a heat mark or "halo" on fabric or surface after labeling. The pressure sensitive crosslinkable adhesive of the present invention when utilized in a label, decorative effect and/or embellishment provides for an easier, quicker application of the label and/or embellishment to a substrate. Furthermore, it allows for a later application of the label and/or embellishment in the manufacturing and application process meaning that the label/embellishment may be applied to a desired substrate later in the supply chain or aftermarket. Additionally, the labels and/or embellishments utilizing the adhesive presently set forth may be utilized for a various reasons in the art such as, but not limited to, cover-up of a mislabeled fabric, relabeling, and or personalization. Additionally, labels and/or embellishments utilizing the adhesive of the present invention allow for seamless application that does not require sewing or fabric penetration. The labels and/or embellishments of the present invention may be utilized on a wide variety of fabric, such as, but not limited to outerwear, durable water repel surfaces, names and numbers, performance/DWR, accessories, leather, denim and footwear. The labels and/or embellishments may also utilize structures which are hard to apply by heat or high pressure such as domed labels, beads, glitters, crystals, stones, holographic foils and laminates, and circuitry embedded garment and battery powered attachments.

In various embodiments, acrylic polymers having functional groups with active hydrogen atoms include copolymers or terpolymers which contain nonfunctional monomer units in combination with further monomer units having functional groups with active hydrogen atoms. The nonfunctional monomer units may be alkyl esters of acrylic acid or methacrylic acid. The alkyl esters of acrylic acid or methacrylic acid may have alkyl groups containing from 1 to 12 carbon atoms. In various embodiments, the alkyl esters of acrylic acid or methacrylic acid may be methyl, ethyl, n-propyl, isopropyl, n-butyl, isobutyl, hexyl, n-octyl, or 2-ethylhexyl esters. The non-functional monomer units may optionally further comprise an ester of a saturated or unsaturated C1 to C12 carboxylic acid and an unsaturated alcohol, such as vinyl acetate. The non-functional monomer units may optionally further contain an ethylenically unsaturated non-functional monomer selected from the group consisting of an olefin monomer, such as ethylene, propylene, or isobutylene; a vinylaromatic monomer, such as styrene or vinyltoluene; or mixtures thereof.

The acrylic polymers having functional groups with active hydrogen atoms additionally contain monomer units having functional groups with active hydrogen atoms. The monomers can be monofunctional or polyfunctional. These functional groups include hydroxy groups, alone or in combination with carboxyl groups. Useful carboxyl functional monomers include acrylic acid, methacrylic acid, itaconic acid, maleic acid, and crotonic acid. Useful hydroxy functional monomers include 2-hydroxyethyl methacrylate, 2-hydroxyethyl acrylate, hydroxymethyl acrylate, hydroxymethyl methacrylate, hydroxyethyl acrylate, hydroxyethyl methacrylate, hydroxypropyl acrylate, hydroxypropyl methacrylate, hydroxybutyl acrylate, hydroxybutyl methacrylate, hydroxyamyl acrylate, hydroxyamyl methacrylate, hydroxyhexyl acrylate, and hydroxyhexyl methacrylate. Further useful hydroxyfunctional monomers include acrylic or methacrylic monoesters of poly(alkylene glycol) and vinyl or allyl monoethers of poly(alkylene glycol).

Acrylic-based polymers having hydroxy functionality which are commercially available and may be used in the crosslinkable pressure-sensitive adhesive disclosed herein include:

Duro-Tak 87-2287 (a non-crosslinked vinyl acetate acrylic pressure-sensitive adhesive with hydroxy functionality), Duro-Tak 87-2516 (a hydroxy functional, crosslinked adhesive), and Duro-Tak 87-2510 (a hydroxy functional non-crosslinked adhesive).

Acrylic-based polymers having carboxyl functionality which are commercially available and may be used in the crosslinkable pressure-sensitive adhesive disclosed herein include:

Duro-Tak 87-2852 (a crosslinked acrylic-based pressure-sensitive adhesive with carboxyl functionality), Duro-Tak 87-2196 (a carboxy functional, crosslinked adhesive), Duro-Tak 87-2296 (a carboxy functional, crosslinked adhesive), Duro-Tak 87-2194 (a carboxy functional, crosslinked adhesive), Duro-Tak 87-2353 (a carboxy functional, non-crosslinked adhesive), and Duro-Tak 87-2154 (a carboxy functional, crosslinked adhesive).

In some embodiments, an adhesive polymer having both hydroxy and carboxyl functional in the same polymer chain may be used. A suitable polymer of this type might contain acrylic acid monomers and hydroxyethyl acrylate monomers. An example of such an adhesive is Duro-Tak 87-2070 (a carboxy and hydroxy functional, crosslinked adhesive).

Adhesive polymers marketed under the name Gelva Multipolymer Solution (GMS) are useful for the adhesives disclosed herein. Gelva GMS 1151, for example, is a hydroxy-functionalized acrylic co-polymer designed for isocyanate crosslinking. Other useful GMS adhesives include GMS 2999 (which contains carboxyl groups and a metal chelate crosslinker). The GMS polymers contain one or both hydroxy and carboxyl functionality, and are produced by free radical polymerization in an organic solvent. The GMS polymers have a Tg of about −30° C. on average, and a molecular weight of roughly 200,000 to 500,000 g/mol. The GMS polymers have a monomer composition containing acidic monomers such as methacrylic acid and acrylic acid; hydroxy monomers such as 2-ethylhexyl acrylate; and non-functional monomers including 2-ethylhexyl acrylate, butyl acrylate, and vinyl acetate.

In various embodiments, the pressure-sensitive crosslinkable adhesive contains only acrylic polymers having hydroxy groups as the sole functional groups. In some embodiments, the pressure-sensitive crosslinkable adhesive contains a first acrylic polymer having hydroxy groups as the sole functional groups and a second acrylic polymer having carboxyl groups as the sole functional groups. Alternatively, the pressure-sensitive crosslinkable adhesive contains at least one acrylic polymer having both hydroxy groups and carboxyl groups as functional groups.

In embodiments containing a first acrylic polymer having hydroxy groups as the sole functional groups and a second acrylic polymer having hydroxy groups as the sole functional groups, the relative amounts of the first acrylic polymer and the second acrylic polymer may be adjusted so that the pressure-sensitive crosslinkable adhesive has a desired mole ratio of hydroxyl groups to carboxyl groups. For example, the adhesive may contain the first acrylic polymer and the second acrylic polymer in amounts which produce a mole ratio of hydroxyl groups to carboxyl groups of about 10:1 to about 0.5:1, about 5:1 to about 1:1, or about 3:1 to about 1:1. Thus, for example, an acrylic polymer containing 5 mol % acrylic acid and an acrylic polymer containing 5 mol % 2-hydroxyethyl acrylate, where the two polymers have similar molecular weights, may be combined in approximately equimolar amounts to produce a pressure-sensitive crosslinkable adhesive having a mole ratio of hydroxyl groups to carboxyl groups of about 1:1. One mole of an acrylic polymer containing 5 mol % acrylic acid, where the two polymers have similar molecular weights, may be combined with two moles of an acrylic polymer containing 5 mol % 2-hydroxyethyl acrylate to produce a pressure-sensitive crosslinkable adhesive having a mole ratio of hydroxyl groups to carboxyl groups of about 2:1.

The pressure-sensitive crosslinkable adhesive additionally contains a crosslinkable composition. The crosslinking composition contains a polyisocyanate which reacts with hydroxyl groups, and a second crosslinking agent having multiple aziridine groups or epoxy groups which react by ring-opening polymerization with carboxyl groups and/or hydroxyl groups. The polyisocyanate may be a diisocyanate of formula III; an oligomer of formula IV derived from reaction between a dioscyanate and a diol or diamine; or a triisocyanate of formula V:

$$O=C=N-R^1-(Y-R^1)_q-N=C=O \quad \text{III}$$

$$O=C=N-[R^1-NHC(=O)X-R^2-XC(=O)NH]_p-R^1-N=C=O \quad \text{IV}$$

$$O=C=N-R^3-(N=C=O)_2 \quad \text{V}$$

$$O=C=N-R^r-(N=C=O)_{r-1} \quad \text{VI}$$

where $R^1$ is a divalent alkylene group, a divalent cycloalkylene group, or a divalent mono- or bicyclic aromatic or heteroaromatic group; Y is selected from the group consisting of —O—, —S—, —CO$_2$—, —CO—, —CONH—, —NHCO—, and —NHCO$_2$—; $R^2$ is a divalent alkylene group or a divalent cycloalkylene group; X is —O— or —NH—; $R^3$ is a trivalent alkylene group, a trivalent cycloalkylene group, or a trivalent mono- or bicyclic aromatic or heteroaromatic group or biuret group or isocyanurate group; q is between 1 and 10; and p is between 0 and 10. $R^r$ is a multivalent alkylene group, a multivalent cycloalkylene group, or a multivalent mono- or bicyclic aromatic or heteroaromatic group, or polyisocyanurate group; r is 4 and above.

In various embodiments, the polyisocyanate may be a compound derived from the reaction between a polyol having from 2 to 6 —OH groups and a diisocyanate of formula III:

$$R^4(OH)_r+O=C=N-R^1-(Y-R^1)_q-N=C=O \rightarrow$$
$$(OH)_{r-s}R-[O(C=)NH-R^1-(Y-R^1)_q-N=C=O]_s$$

where $R^4$ is a multivalent alkyl, cycloalkyl, or aromatic group, r and s are between 2 and 6, and r-s is from 0 to 4. Suitable polyisocyanates include toluene diisocyanate, bis (4-isocyanato phenyl)methane, bis (4-isocyanato hexyl) methane, hexamethylene diisocyanate, tetramethylene diisocyanate, oligomers thereof, and mixtures thereof. Any of the known polyisocyanate crosslinking agents may be used. A number of suitable crosslinking agents are available from Bayer (Pittsburgh, Pa.) under the general trade designation Desmodur®. For example, Desmodur N 3300 is an isocyanurate of aliphatic hexamethylene diisocyanate, and Desmodur CB-75N is an oligomeric toluene diisocyanate.

The second crosslinking agent is a polyaziridine or a polyepoxide. Polyaziridines are derived from aziridines which are trifunctional amine compounds which may be derived from ethyleneimine. An example of a useful commercially available polyaziridine is NeoCryl CX 100 available from Avecia Resins, and this crosslinking agent is identified as trimethylol-tris N(methylaziridinyl))propionate. Another commercially available polyfunctional aziridine is Witcolink AZ-28 and 33 from Chemtura.

In various embodiments, the polyaziridine may be a triester of pentaerithritol or trimethylolpropane and 3-(2-methyl-1-aziridine)propionic acid; 1,1'-(1,3-phenylenedicarbonyl)bis[2-methyl aziridine], 2,2,4-trimethyladipoyl bis [2-ethyl aziridine]; 1,1'-Azelaoyl bis[2-methyl aziridine], and mixtures thereof. Aliphatic and aromatic polyisocyanates may be used as crosslinking agents in the coating compositions.

Epoxy compounds (oxiranes) are also useful as crosslinking agents, as alternatives to polyaziridines or in admixture with polyaziridines. Suitable epoxy compounds include, but are not limited to, epoxy modified bisphenol A, e.g., a diglycidyl ether of bisphenol A, and epichlorohydrin epoxy resins. Other reactive epoxy compounds include phenol novolac epoxy resins, resorcinol epoxy resins, multi-epoxy functionalized glycidyl ethers or glycidyl esters or amines, elastomer modified epoxy resins.

In various embodiments, the pressure sensitive adhesive composition is prepared as a single-part formula. The pressure-sensitive crosslinkable adhesive is prepared by dissolving the acrylic adhesive polymer or polymers in an organic solvent carrier, e.g., ethyl acetate, toluene, hexane, heptane, mineral spirits, ketones, with thorough mixing to produce a solution containing from about 20% to about 60% solids, or from about 25% to about 54% solids. While continuing to mix the acrylic adhesive polymer(s), the crosslinkable composition is added. The adhesive may then be cast and dried to form an adhesive film. The crosslinking composition contains a polyisocyanate, and a second crosslinking agent having multiple aziridine groups or epoxy groups.

In various embodiments disclosed herein, the polyisocyanate and the second crosslinking agent are added to the acrylic adhesive polymer(s) simultaneously. In other embodiments disclosed herein, the polyisocyanate and the second crosslinking agent are added to the acrylic adhesive polymer(s) separately. In some embodiments, the second crosslinking agent, i.e., the crosslinking agent having multiple aziridine groups or epoxy groups, is added to the acrylic adhesive polymer(s) prior to addition of the polyisocyanate. For cases in which the crosslinking agent having multiple aziridine groups or epoxy groups is added prior to the polyisocyanate, the polyaziridine or polyepoxide slows down the reaction between polyisocyanate and the adhesive polymer(s). Additionally, at ambient temperature the adhesive polymer(s) react slowly with the polyaziridine or polyepoxide at ambient temperature, causing the adhesive mixture to have an extended pot life prior to curing when stored at ambient temperature. Thus, the polyaziridine or polyepoxide/adhesive polymer mixture may be stored for an extended time until the user is ready to use the adhesive composition. The isocyanate component of the crosslinking composition may then be added, and the adhesive may be cast into a film and heat cured. If the isocyanate component is added prior to the polyaziridine or polyepoxide, the adhesive polymer(s) will react more quickly with the isocyanate at ambient temperature, causing the adhesive mixture to have a shorter pot life at ambient temperature.

The adhesive described in the current disclosure is used for adhering two apparel substrates together. The apparel substrates may be fabric, paper, cardboard, wood, silk, polymer or leather. In various embodiments, the substrates are woven, knitted, or nonwoven fabrics and other label and embellishment materials. The fabrics may be made from synthetic or natural fibers. Suitable natural fabrics include knitted and woven fabrics made from fibers of cotton, silk, wool, leather, hemp, jute, linen, or mixtures thereof. Suitable synthetic fabrics include knitted and woven fabrics made from fibers of rayon, acetate, nylon, acrylic, polyester, olefin, spandex, lastex, Kevlar, or mixtures thereof. The fabrics may be made from blends of synthetic end natural fibers, e.g., blends of polyester and cotton. In various embodiments, the adhesive is applied to one side of a first substrate. The first substrate may be a label or embellishment material. In various embodiments, the label has printed matter or woven pattern (the pattern may be simulated) on a first major surface, i.e., the obverse surface of the label. The adhesive is then applied to the second major surface of the label, i.e., the reverse surface of the label. The adhesive-coated reverse surface of the label is then applied with pressure to a second fabric substrate. The adhesive is then allowed to dwell or equilibrate at ambient temperature.

Crosslinking in the adhesive layer takes place by reaction between hydroxyl groups on the acrylic adhesive polymer and the polyisocyanate crosslinker; and by reaction between carboxyl and/or hydroxyl groups on the acrylic adhesive polymer and the polyaziridine or polyepoxide crosslinker. If one or both apparel substrates are made from natural or synthetic fibers having free hydroxyl groups, e.g., cotton, the polyisocyanate may additionally react with free hydroxyl groups on the fabric substrate. In the resulting fabric laminate, the fabric layers are adhered together with a high shear strength and superior wash resistance.

Example 1: Adhesive Formulations

A variety of adhesive compositions, set forth in Table 1, were prepared in accordance with the teachings of the present disclosure. The adhesives contained a Gelva Multipolymer Solution (GMS) adhesive base, which was either GMS 1151; a mixture of GMS 1151 and GMS 2999; or a mixture of GMS 1151 and an inert benzoate plasticizer in a hexane/ethyl acetate diluent. The diluent provides viscosity reduction, and allows application of a thinner adhesive layer and a more accurate measurement of the composition. The GMS-1151 adhesive has hydroxyl functional groups, and the GMS-2999 has carboxyl functional groups. The pentaerythritol-4-benzoate solid plasticizer can be added in as liquid form by pre-dissolving in MEK.

The GMS polymers are functionalized acrylic co-polymers containing methacrylic acid, acrylic acid, 2-ethylhexyl acrylate, 2-ethylhexyl acrylate, butyl acrylate, and up to 2 wt. % vinyl acetate. The mixture of GMS polymers contain about 5 to about 8 wt. % hydroxy- and carboxyl-functional monomers, in a mole ratio of hydroxy-functional monomers to carboxyl-functional monomers of about 2 or greater. The formulations contain PZ-33 in combination with XL-600 as a crosslinking formulation. PZ-33, available from PolyAziridine, LLC, is a polyaziridine crosslinker which is a triester of pentaerithritol and 3-(2-methyl-1-aziridine)propionic acid [Pentaerythritol Tris (3-(1-Aziridinyl) Propionate]. XL-600, available from Perstorp as Easaqua™ XL-600, is an isocyanurate of an aliphatic diisocyanate which is a cyclic oligomer having about three diisocyanate units.

TABLE 1

| | Adhesive formulations | | | | |
|---|---|---|---|---|---|
| PSA # | PSA Base | XL-600 (%) | PZ-33 (%) | PZ/XL ratio | 2999/1151 ratio |
| 16-M | 1151 | 0.63 | 7.81 | 12.50 | 0.00 |
| 16-N | 1151 | 0.63 | 10.94 | 17.50 | 0.00 |
| 16-R | 1151 | 0.74 | 9.53 | 12.84 | 0.00 |
| 16-S | 1151 | 1.02 | 12.66 | 12.46 | 0.00 |

TABLE 1-continued

| | Adhesive formulations | | | | |
|---|---|---|---|---|---|
| PSA # | PSA Base | XL-600 (%) | PZ-33 (%) | PZ/XL ratio | 2999/1151 ratio |
| 16-O | 1151 + 2999 | 0.60 | 7.54 | 12.50 | 0.40 |
| 16-T | 1151 + 2999 | 0.70 | 9.34 | 13.26 | 0.75 |
| 16-P | 1151 + 2999 | 0.65 | 7.65 | 11.82 | 1.00 |
| 16-Q | 1151 + Benzoate | 0.58 | 7.08 | 12.14 | 0.00 |

Example 2: Adhesive Wash Resistance

The wash resistance of the pressure sensitive adhesives prepared according to the teachings of the current disclosure, specifically 16-N, 16-0, and 16-T of Table 1, was compared to wash resistance of two conventional acrylic pressure sensitive adhesives, Worthen PS 603P and AS-801 both believed to be carboxyl functionalized and not crosslinked by polyisocyanates. The adhesives were used to prepare test laminates of a label and a fabric substrate. The fabric substrate was either a white polyester knit or a white heavy weight cotton knit.

The labels were polyester 4800 TWT labels, woven edge polyester satin PFL 601 with Uniti® thermal print labels, or woven patch construct labels. The printed fabric labels may contain texts and graphic design on the front face by direct or transfer printing; the woven labels have the design incorporated in the weaving. The laminates were prepared by depositing a layer of adhesive on the reverse side of the label, contacting the fabric on the exposed surface of the adhesive, and laminating the fabric layer at room temperature under a 15"×15" platen of inlet pressure 80 psi, which is 15.6 psi platen pressure, for 15 sec.

The resulting laminates were then washed 5 times in a front loading washer at 140° F., and dried after each wash cycle. The laminates were then examined for signs of label delamination, peeling or lifting. The results are printed in Table 2.

The 16 series adhesive 16-N showed poor adhesion if applied to the label in a thin layer, e.g., about ~25 gsm adhesive. As seen in Table 2, a thin layer of adhesive 16-N showed poor delamination resistance during the wash cycles; however, the label still remained attached to the substrate. When applied in a thicker layer, e.g., ~100 gsm adhesive, adhesives 16-O, 16-N and 16-T all remained firmly attached to the substrate. Changing the drying temperature from 90° C. to 100° C. caused little if any change in delamination resistance during the washing process. Adhesives 16-O, 16-N and 16-T showed good delamination resistance during washing for a range of test label types on both polyester and cotton fabrics, where the labels had either rounded edges or sharp corners.

In contrast, the comparative AS-801 and Worthen adhesives were prone to delamination.

The test laminates were then washed an additional 5 times (10 times total), and observed for evidence of delamination. The results are presented in Table 3. Again, adhesives 16-O, 16-N and 16-T showed superior delamination resistance to the comparative AS-801 and Worthen adhesives.

TABLE 2

WASH RESULTS (5 CYCLES) SCORE

| Label Substrates | Fabric | 16-N (100+ gsm, 90 C.) | 16-O (100+ gsm, 90 C.) | 16-T (100+ gsm, 90 C.) | 16-N (24 gsm, 100 C.) | 16-O (100+ gsm, RT hold then 90 C.) | 16-T (100+ gsm, 100 C.) | AS-801 (80 gsm) | Worthen (125 gsm) |
|---|---|---|---|---|---|---|---|---|---|
| 4800TWT Round | Cotton | P | NA | P | H | P | P | NA | NA |
| 4800TWT Straight | Cotton | P | P | P | H | P | P | T | NA |
| Woven Patch Round | Cotton | P | P | P | H | P | P | T | NA |
| Woven Patch Straight | Cotton | P | P | P | H | P | P | T | NA |
| 601 Round | Cotton | P | NA | P | H | NA | P | T | NA |
| 601 Straight | Cotton | P | P | P | H | P | P | T | NA |
| 4800TWT Round | Polyester | P | NA | P | H | P | P | NA | NA |
| 4800TWT Straight | Polyester | P | P | P | H | P | P | P | NA |
| Woven Patch Round | Polyester | P | P | P | H | P | P | S | NA |
| Woven Patch Straight | Polyester | P | P | P | H | P | P | H | NA |
| 601 Round | Polyester | P | NA | P | H | NA | P | H | NA |
| 601 Straight | Polyester | P | P | P | H | P | P | H | NA |
| Worthen Fabric | Cotton | NA | NA | NA | NA | NA | NA | NA | T |
| Worthen Fabric | Polyester | NA | NA | NA | NA | NA | NA | NA | P |

Scoring Guide
Pass = Less than 2 mm of lifting P
Total Label Missing T
Heavy Lifting = Over 4 mm but not total H
Slight Lifting = 2 mm-4 mm S
NA: Not available

TABLE 3

WASH RESULTS (10 CYCLES) SCORE

| Label Substrates | Fabric | 16-N (100+ gsm, 90 C.) | 16-O (100+ gsm, 90 C.) | 16-T (100+ gsm, 90 C.) | 16-N (24 gsm, 100 C.) | 16-O (100+ gsm, RT hold then 90 C.) | 16-T (100+ gsm, 100 C.) | AS-801 (80 gsm) | Worthen (125 gsm) |
|---|---|---|---|---|---|---|---|---|---|
| 4800TWT Round | Cotton | P | NA | P | H | P | P | NA | NA |
| 4800TWT Straight | Cotton | P | P | P | H | P | P | T | NA |
| Woven Patch Round | Cotton | P | P | P | H | P | P | T | NA |
| Woven Patch Straight | Cotton | P | P | P | H | P | P | T | NA |
| 601 Round | Cotton | P | NA | P | H | NA | P | T | NA |
| 601 Straight | Cotton | P | P | P | H | P | P | T | NA |
| 4800TWT Round | Polyester | P | NA | P | H | P | P | NA | NA |
| 4800TWT Straight | Polyester | P | P | P | H | P | P | H | NA |
| Woven Patch Round | Polyester | P | P | P | H | P | P | H | NA |
| Woven Patch Straight | Polyester | P | P | P | H | P | P | H | NA |
| 601 Round | Polyester | P | NA | P | H | NA | P | H | NA |
| 601 Straight | Polyester | P | P | P | H | P | P | H | NA |

TABLE 3-continued

WASH RESULTS (10 CYCLES) SCORE

| Label Substrates | Fabric | 16-N (100+ gsm, 90 C.) | 16-O (100+ gsm, 90 C.) | 16-T (100+ gsm, 90 C.) | 16-N (24 gsm, 100 C.) | 16-O (100+ gsm, RT hold then 90 C.) | 16-T (100+ gsm, 100 C.) | AS-801 (80 gsm) | Worthen (125 gsm) |
|---|---|---|---|---|---|---|---|---|---|
| Worthen Fabric | Cotton | NA | NA | NA | NA | NA | NA | NA | T |
| Worthen Fabric | Polyester | NA | NA | NA | NA | NA | NA | NA | S |

Example 3: Adhesive Formulations

A variety of adhesive compositions, set forth in Table 4, were prepared in accordance with the teachings of the present disclosure. The adhesives contained a Gelva Multipolymer Solution (GMS) adhesive base, which was GMS 1151 in a hexane/ethyl acetate diluent (solids 41%, diluted to 27-31% solids). The formulations contain PZ-33 or PZ-28 [Trimethylolpropane tris(2-methyl-1-aziridine propionate)] in combination with XL-600 as a crosslinking formulation. The concentration of XL-600 varied from 0.44 wt. % to 0.75 wt. %, and the concentration polyaziridine crosslinker varied from 5.56 wt. % to 18.75 wt. %. The ratio of polyaziridine to XL-600 polyisocyanate varied from 8.33 to 37.5.

TABLE 4

Adhesive formulations.

| Comp # | XL-600 (%) | PZ (%) | PZ/XL Ratio |
|---|---|---|---|
| 14-Q | 0.50 | 6.25 | 12.50 |
| 14-R | 0.50 | 12.50 | 25.00 |
| 14-S | 0.50 | 18.75 | 37.50 |
| 14-T | 0.75 | 6.25 | 8.33 |
| 14-U | 0.75 | 12.50 | 16.67 |
| 14-V | 0.75 | 18.75 | 25.00 |
| 14-W | 0.44 | 5.56 | 12.50 |
| 14-X | 0.67 | 5.56 | 8.33 |
| 12-Y | 0.47 | 9.38 | 20.00 |

A woven label was bonded to a white cotton fabric substrate using each of the adhesives of Table 4 to produce a series of laminates. Each laminate was then washed 5 times in a front loading washer at 140° F., and dried after each wash cycle. Adhesion between the substrate and the label was maintained after five wash cycles for each laminate. While all adhesives were effective, some showed some evidence of peeling after five wash cycles. See FIGS. 1A through 1H. The most effective adhesives were formulations 14-Q and 14-X. Accordingly, it appears that a high performing formulations include a binary crosslinking formulation of XL-600 in an amount of around 0.5 wt. % to 0.7 wt. % and a polyaziridine crosslinker in an amount of around 5 wt. % to 7 wt. % of the formulation. The PZ/XL-600 ratio may be about 10.

Example 4: Shear Resistance of Adhesive Formulations

In this example, the shear resistance of each adhesive of Table 1 was measured. Each adhesive was cast on siliconized release paper, oven dried, and covered with a siliconized PET release film. The resulting laminates were aged at room temperature for 7 days. After removal of the release papers, the adhesive films were used to laminate PFL 601 labels and Hanes cotton fabric at room temperature under 80 psi pressure for 15 s. The laminates were cut into 0.5" wide test strips with 0.5"×0.5" PSA area, and soaked in deionized water for 1 hr for one set of test strips and 67 hr for another set of test strips. The test strips were then subjected to a static shear load of 500 g at room temperature (4 trials each). The results are recorded in Tables 5 through 12.

TABLE 5

Wet Shear (67 hr soak DI H2O)
PFL 601/16-M/Hanes wht cotton

| Sample # | min |
|---|---|
| 16-M | 1660.85 |
| | 335.45 |
| | 152.3 |
| | 184.55 |
| Avg | 583.29 |
| Std | 722.80 |

TABLE 6

Wet Shear (67 hr soak DI H2O)
PFL 601/16-N/Hanes wht cotton

| Sample # | min |
|---|---|
| 16-N | 189.6 |
| | 442.55 |
| | 283.45 |
| | 329.65 |
| Avg | 311.31 |
| Std | 105.12 |

TABLE 7

Wet Shear (67 hr soak DI H2O)
PFL 601/16-O/Hanes wht cotton

| Sample # | min |
|---|---|
| 16-O | 406.1 |
| | 984.45 |
| | 488.2 |
| | 2820+ |
| Avg | 626.25 |
| Std | 312.91 |

TABLE 8

Wet Shear (67 hr soak DI H2O)
PFL 601/16-P/Hanes wht cotton

| Sample # | min |
|---|---|
| 16-P | 371.4 |
|  | 1771.4 |
|  | 71.05 |
|  | 209.85 |
| Avg | 605.93 |
| Std | 786.62 |

TABLE 9

Wet Shear (1 hr soak DI H2O)
PFL 601/16-Q/Hanes wht cotton

| Sample # | min |
|---|---|
| 16-Q | 261.55 |
|  | 210.2 |
|  | 127.85 |
|  | 334.25 |
| Avg | 233.46 |
| Std | 86.88 |

TABLE 10

Wet Shear (1 hr soak DI H2O)
PFL 601/16-R/Hanes wht cotton

| Sample # | min |
|---|---|
| 16-R | 417.35 |
|  | 277.65 |
|  | 233.7 |
|  | 263.35 |
| Avg | 298.01 |
| Std | 81.64 |

TABLE 11

Wet Shear (1 hr soak DI H2O)
PFL 601/16-S/Hanes wht cotton

| Sample # | min |
|---|---|
| 16-S | 1101.95 |
|  | 146.8 |
|  | 289.8 |
|  | 169.2 |
| Avg | 426.94 |
| Std | 454.37 |

TABLE 12

Wet Shear (1 hr soak DI H2O)
PFL 601/16-T/Hanes wht cotton

| Sample # | min |
|---|---|
| 16-T | 251.95 |
|  | 203.05 |
|  | 187.85 |
|  | 124.85 |
| Avg | 191.93 |
| Std | 52.42 |

Other formulations using PZ-28 as a polyaziridine crosslinker were also tested. Formulations containing PZ33 showed higher wet shear strength than formulations containing PZ-28. In general, a longer soak time did not seem to affect wet shear strength. All compositions provided a minimum wet shear holding time of ~200 min. For adhesives containing GMS 1151 as the sole adhesive base polymer, all compositions had a minimum time to shear failure of ~200 min, indicating that the adhesive formulation has a broad range of working compositions. For adhesives containing GMS 1151 as an adhesive base polymer in combination with GMS 2999 or an inert benzoate ester, the compositions also had a minimum time to shear failure of 200 min. The best wet shear was observed with formulation 16-0, containing GMS 2999 and GMS 1151 in a ratio of about 0.4:1. Some very high shear strength values may indicate a PSA shear strength approaching 500 g/0.5".

Figure 2A:
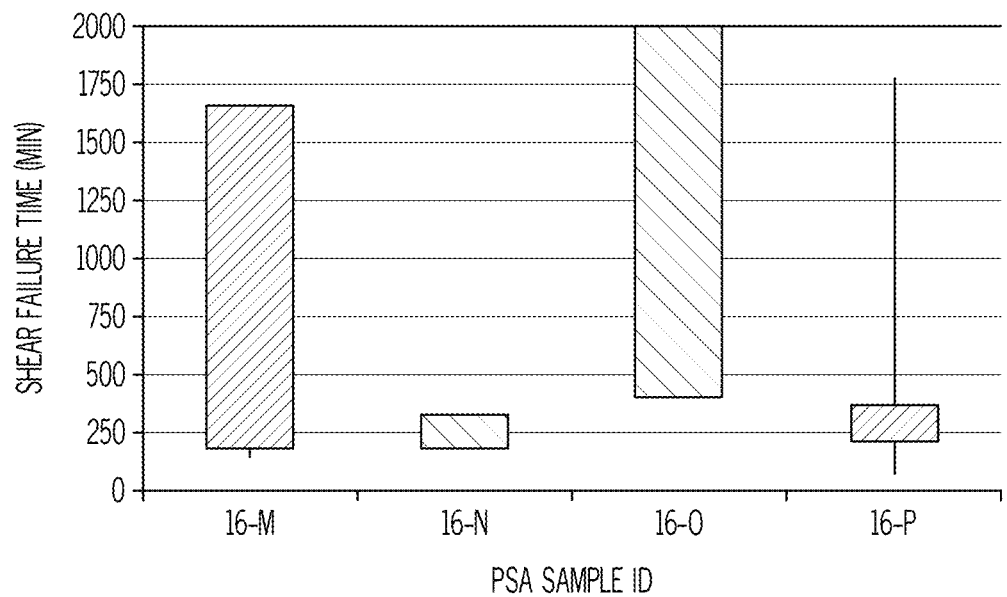
FIG. 2A is a graph illustrating the shear strength of laminates subjected to a 67 hour soak.
Figure 2B:
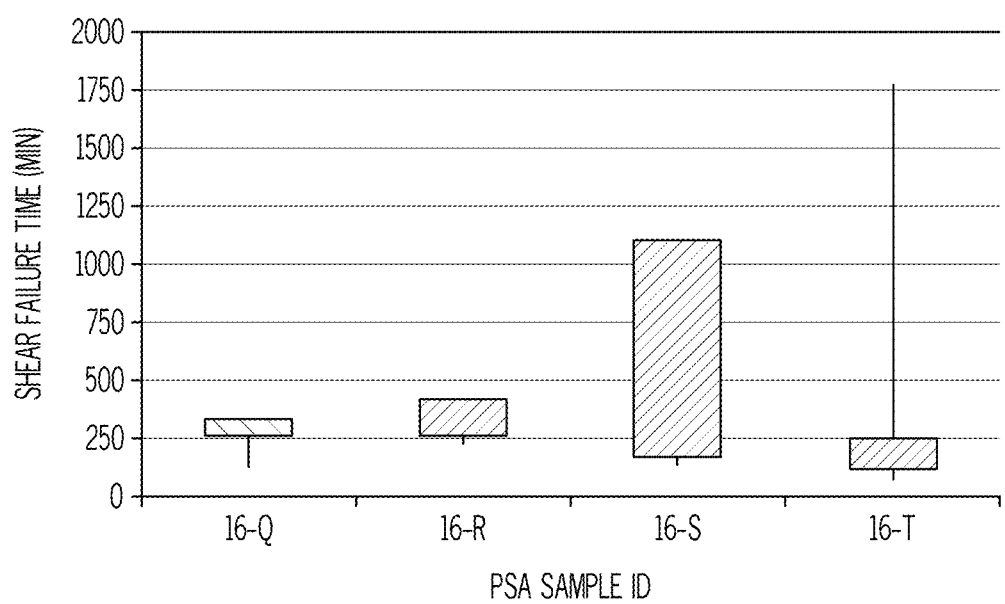
FIG. 2B is a graph illustrating the shear strength of laminates subjected to a 1 hour soak.

The range of holding time for each formulation subjected to a 67 hour soak is presented in FIG. 2A. The range of holding time for each formulation subjected to a 1 hour soak is presented in FIG. 2B.

Comparative Example 1: Shear Resistance of Comparative Adhesive Formulations

This example examines shear resistance of comparative adhesive formulations. The first comparative adhesive is a film cast from GMS 1151 polymer solution in the absence of a crosslinker. GMS 1151 polymer solution was cast on siliconized release paper, oven dried, and covered with a siliconized PET release film. The resulting laminates were aged at room temperature for 7 days. The second comparative adhesive is prepared from AS 801, a commercially available pressure-sensitive adhesive from Avery Dennison Corporation. The adhesive films were used to laminate PFL 601 labels and Hanes cotton fabric at room temperature under 80 psi pressure for 15 s. The laminates were cut into 0.5" wide test strips with 0.5"×0.5" PSA area, and either subjected to dry shear or soaked in deionized water for 1 hr before shear test. The test strips were then subjected to a static shear load of 500 g at room temperature (4 trials each). As seen in Table 13, the dry shear resistance of a non-crosslinked GMS 1151 adhesive was very low when compared to the shear resistance of crosslinked GMS 1151 adhesives (See Tables 5, 6, 10, and 11 above). Due to the poor dry shear resistance of non-crosslinked GMS 1151 adhesive, wet shear resistance was not measured for this adhesive Both wet and dry shear resistance of AS 801 film adhesive was measured. The AS 801 film adhesive had a lower dry shear resistance than the wet shear resistance of the adhesives described in the current disclosure. As seen in Table 15, dry AS 801 provided a minimum dry shear holding time of 12.5 min, while the compositions disclosed herein provided a minimum wet shear holding time of 200 min (See Tables 5 through 12). Unlike the crosslinked compositions disclosed herein, exposure to water significantly degraded the shear strength of AS 801 film adhesive. After soaking in deionized water for 1 hr, the minimum shear holding time for AS 801 film adhesive declined from 12.5 min (dry) to below 2.5 min (wet, see Table 14).

TABLE 13

Shear resistance of GMS 1151 adhesive in
the absence of a crosslinker.
PFL 601/1151/Cotton, Dry Shear

| Sample # | min |
|---|---|
| 1151 | 0.5 |
| 1151 | 0.45 |

TABLE 13-continued

Shear resistance of GMS 1151 adhesive in
the absence of a crosslinker.
PFL 601/1151/Cotton, Dry Shear

| Sample # | min |
|---|---|
| 1151 | 0.4 |
| 1151 | 0.5 |
| Avg | 0.46 |
| Std | 0.05 |

TABLE 14

Wet shear resistance of AS 801 adhesive in
the absence of a crosslinker.
PFL 601/801/Cotton, Wet Shear (1 hr soak in RT DI H2O)

| Sample # | min |
|---|---|
| 801 | 2.45 |
| 801 | 1.65 |
| 801 | 2.25 |
| 801 | 2.2 |
| Avg | 2.14 |
| Std | 0.34 |

TABLE 15

Dry shear resistance of AD 801 adhesive in
the absence of a crosslinker.
PFL 601/801/Cotton, Dry Shear

| Sample # | min |
|---|---|
| 801 | 10.9 |
| 801 | 14.5 |
| 801 | 13.7 |
| 801 | 10.85 |
| Avg | 12.49 |
| Std | 1.89 |

Example 5: Peel Resistance of Adhesive Formulations

In this Example, the peel resistance of adhesive 17-X, prepared in accordance with the teachings of the present disclosure, was evaluated. Adhesive 17-X contains a base of GMS 1151 in a solution phase containing 29.23% solids, and a crosslinking formulation containing polyaziridine PZ-33 and isocyanate XL-600 in a ratio of 9.46 (1.16 wt. % XL-600 and 10.94 wt. % PZ-33). Adhesive 17-X was cast on siliconized release paper, oven dried at 90° C. for 5 min, and covered with a siliconized PET release film. The resulting laminates were aged at room temperature for 7 days. After removal of the release papers, the adhesive films were used to laminate PFL 601 labels and Hanes cotton fabric or polyester fabric at room temperature under 80 psi pressure for 15 s. Adhesive 17-X was applied in an amount of 73 g/m². The laminates were cut into 2.5" wide test strips of length 15 cm, where 2.5 cm at one end of the test strips were unbonded and 12.5 cm were bonded.

Figure 3A:
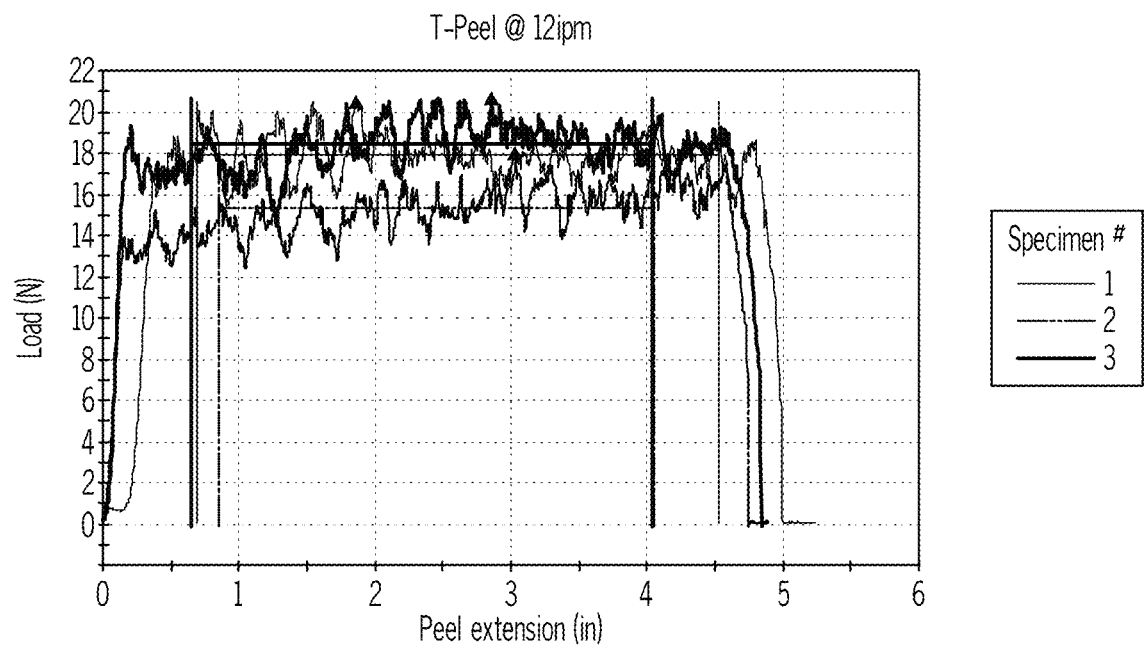
FIG. 3A is a graph illustrating the peel strength of PSA 17-X adhesive with cotton substrate.
Figure 3B:
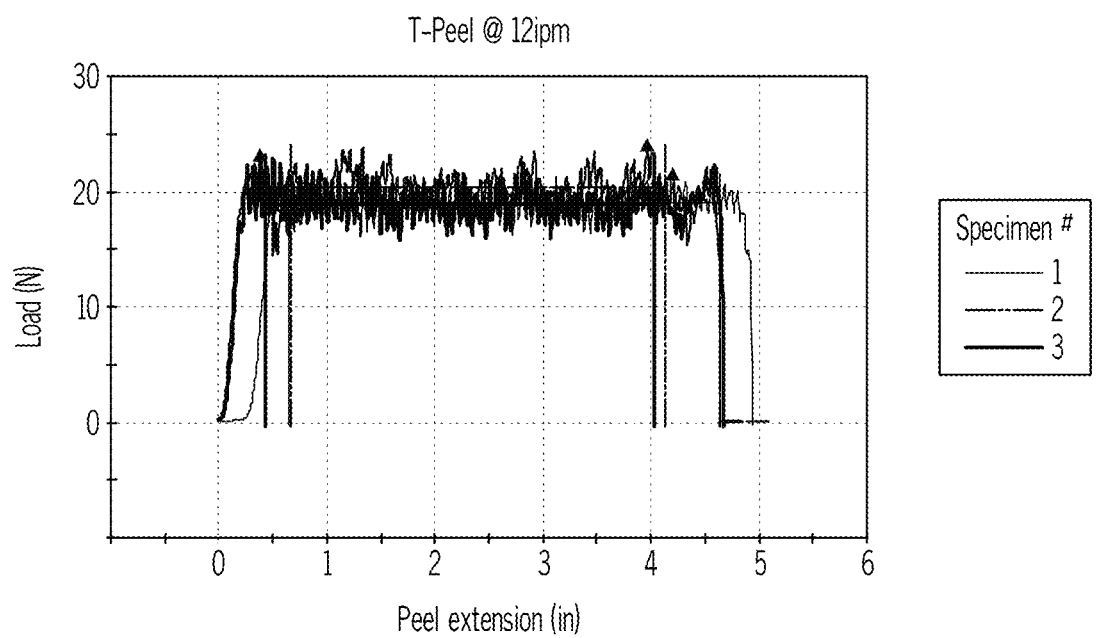
FIG. 3B is a graph illustrating the peel strength of PSA 17-X adhesive with polyester substrate.

The laminates were then subjected to a T-peel test (three trials), where the fabric substrate and the label material were split to + and −909 and pulled at a constant rate of 12 inches/minute until the adhesive bond between the layers failed. The maximum load and the average load were recorded. The results for a polyester substrate and a cotton substrate are recorded in Tables 16 and 17, respectively. See also FIGS. 3A and 3B.

TABLE 16

Peel resistance of Adhesive 17-X with a polyester substrate.
601 Uniti PFL/PSA 17-X/polyester

| | Maximum Load (N) | Average Load (N) | Comments/ Observations |
|---|---|---|---|
| 1 | 21.560 | 19.087 | Cohesive failure |
| 2 | 24.067 | 20.429 | same |
| 3 | 23.194 | 18.920 | same |
| Mean | 22.940 | 19.479 | |
| Standard Deviation | 1.273 | 0.627 | |

TABLE 17

Peel resistance of Adhesive 17-X with a cotton substrate.
601 Uniti PFL/PSA 17-X/cotton

| | Maximum Load (N) | Average Load (N) | Comments/Observations |
|---|---|---|---|
| 1 | 20.500 | 17.912 | total adhesive transfer |
| 2 | 18.035 | 15.324 | same |
| 3 | 20.650 | 18.421 | same |
| Mean | 19.729 | 17.219 | |
| Standard Deviation | 1.468 | 1.661 | |

Comparative Example 2: Peel Resistance of Comparative Adhesive Formulations

Figure 3C:
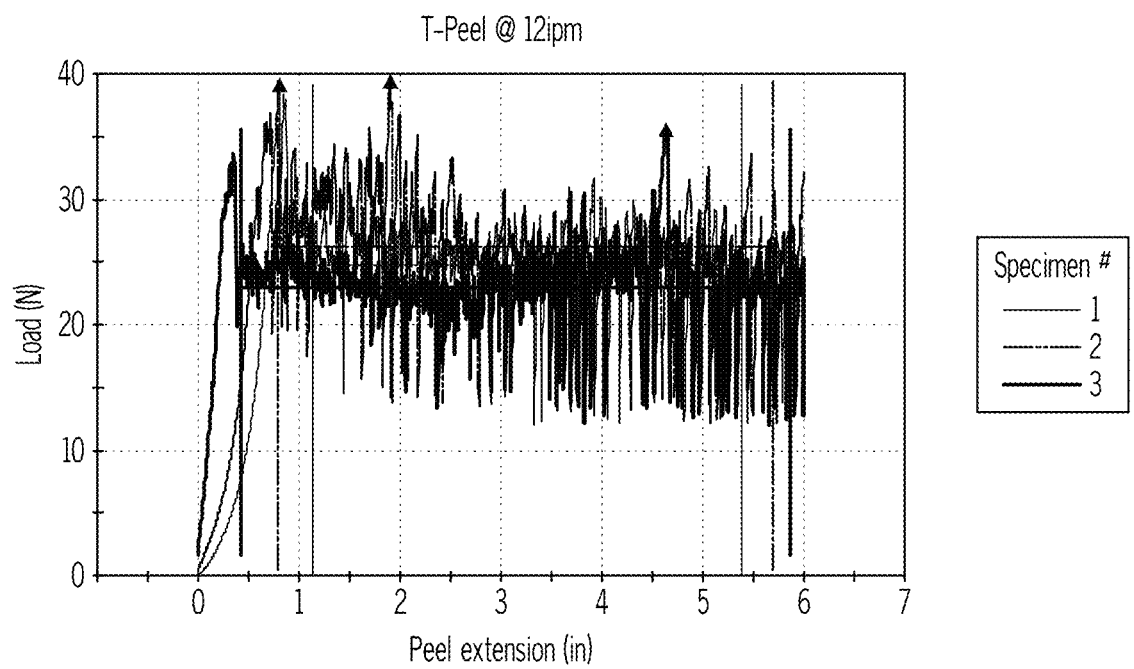
FIG. 3C is a graph illustrating the peel strength of hot melt adhesive with cotton substrate.
Figure 3D:
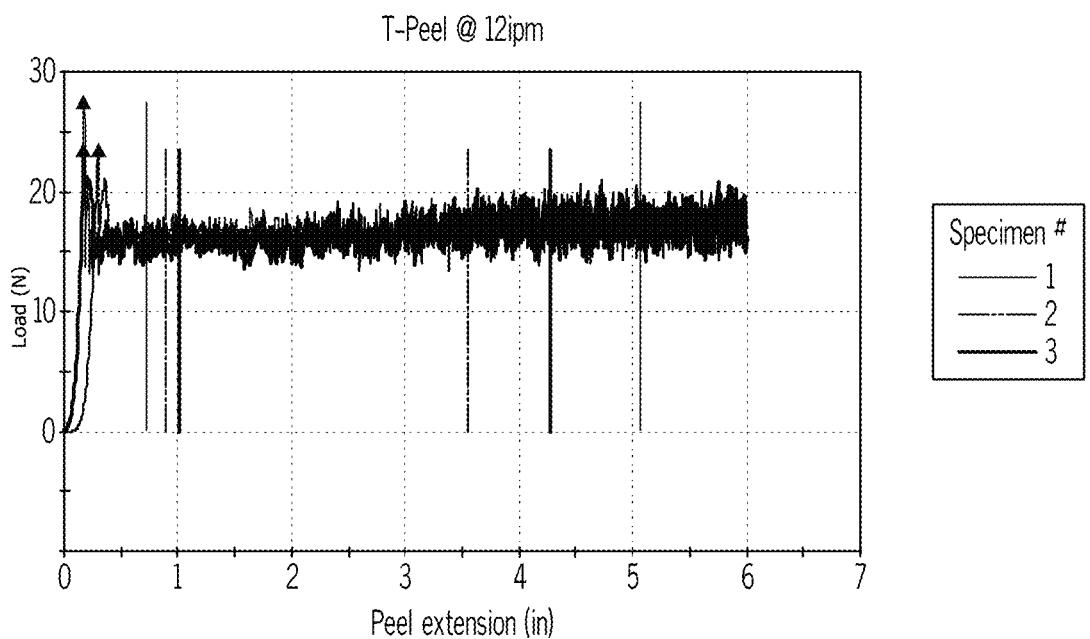
FIG. 3D is a graph illustrating the peel strength of hot melt adhesive with polyester substrate.
Figure 3E:
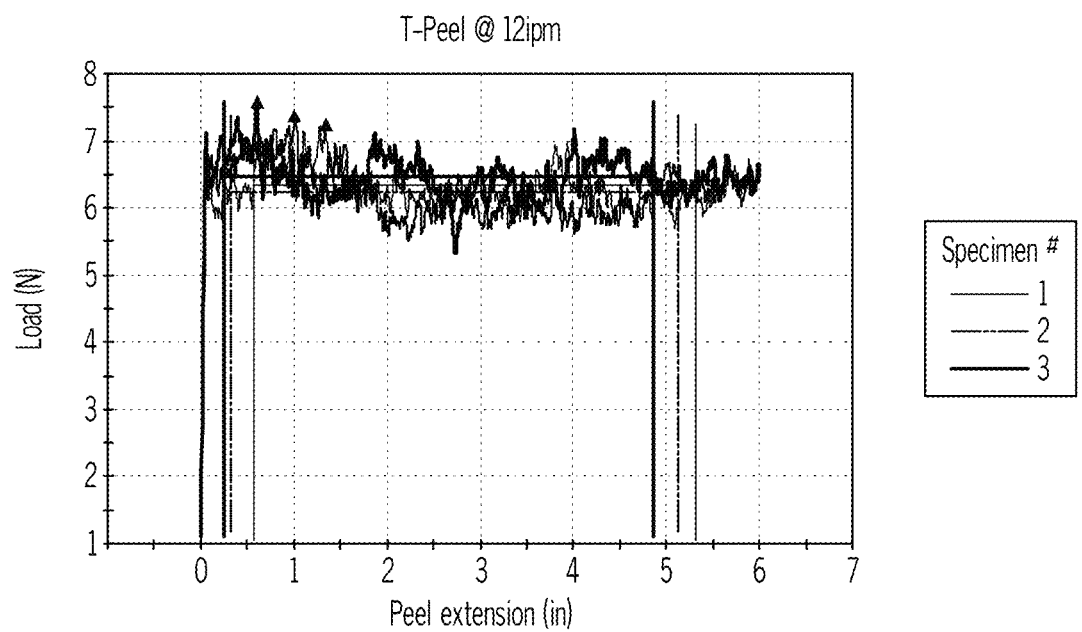
FIG. 3E is a graph illustrating the peel strength of AS-801 adhesive with cotton substrate.
Figure 3F:
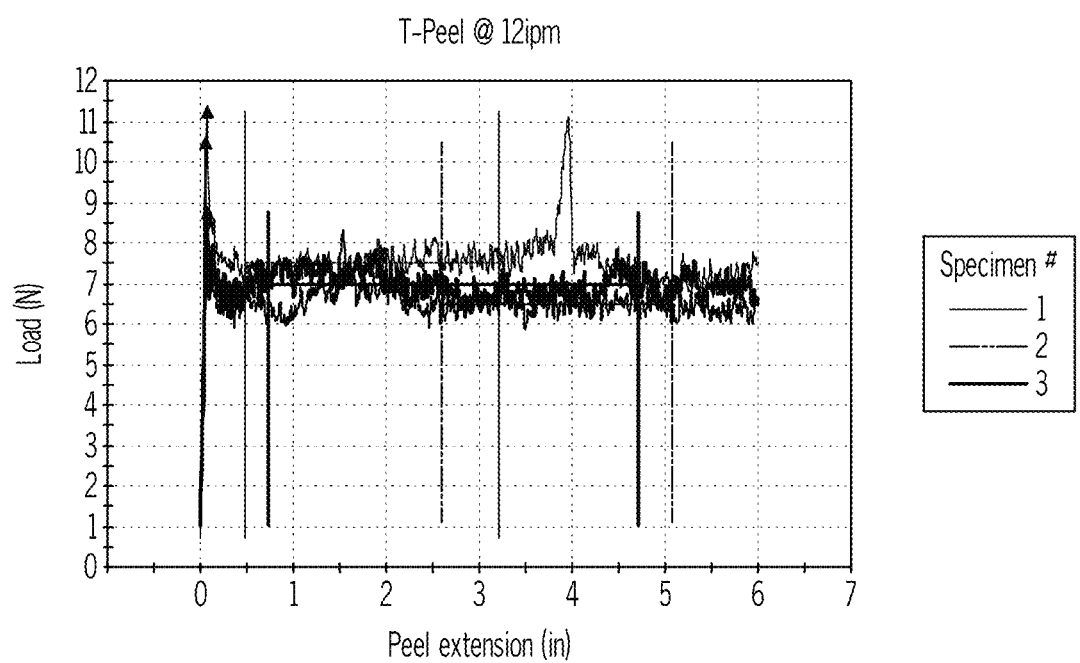
FIG. 3F is a graph illustrating the peel strength of AS-801 adhesive with polyester substrate.

A series of PFL 601/cotton and PFL/polyester laminates were prepared in the same manner as the laminates of Example 5, except that conventional hot melt adhesive, commercially available as Bemis 5229 which has polyester adhesive cast on the back side of a fabric face material, or a conventional pressure-sensitive adhesive (AS-801) was used to bond the substrate to the label material. The resulting PFL 601/cotton and PFL/polyester laminates were then subjected to a T-peel test (three trials). The hot melt adhesive was applied at a coating weight of 145 g/m², and AS-801 was applied at a coating weight of 80 g/m². The results for the laminates containing the hot melt adhesive are recorded in Tables 18 and 19, and in FIGS. 3C and 3D. The results for the laminates containing PSA 801 are recorded in Tables 20 and 21, and in FIGS. 3E and 3F.

Upon comparing results obtained with the conventional pressure sensitive adhesive AS-801 to results from Adhesive 17-X, Adhesive 17-X has a peel strength about three times that of AS-801. Upon comparing results obtained with the conventional hot melt adhesive to results from Adhesive 17-X, Adhesive 17-X has a peel strength from polyester about 20% higher than the peel strength from polyester of the hot melt adhesive, even with a lower coat weight (73 g/m² for 17-X, vs. 145 g/m² for the hot melt adhesive). However, Adhesive 17-X has a peel strength from cotton about 30% lower than the peel strength from cotton of the hot melt adhesive, possibly due to lower fabric penetration from a reduced coat weight (73 g/m² for 17-X, vs. 145 g/m² for the hot melt adhesive). Table 18. Peel resistance of hot melt adhesive with a polyester substrate.

TABLE 18

Peel resistance of hot melt adhesive with a polyester substrate.
601 Uniti PFL/HMA 5229/polyester

|   | Maximum Load (N) | Average Load (N) | Comments/Observations |
|---|---|---|---|
| 1 | 27.502 | 16.831 | total adhesive transfer |
| 2 | 23.504 | 16.362 | same |
| 3 | 23.515 | 16.26 | same |
| Mean | 24.841 | 16.484 | |
| Standard Deviation | 2.305 | 0.305 | |

TABLE 19

Peel resistance of hot melt adhesive with a cotton substrate.
601 Uniti PFL/HMA 5229/cotton

|   | Maximum Load (N) | Average Load (N) | Comments/Observations |
|---|---|---|---|
| 1 | 39.148 | 24.792 | total adhesive transfer, cotton induced zippy peel |
| 2 | 39.418 | 26.214 | same |
| 3 | 35.553 | 22.968 | same |
| Mean | 38.04 | 24.658 | |
| Standard Deviation | 2.158 | 1.627 | |

TABLE 20

Peel resistance of PSA 801 adhesive with a polyester substrate.
601 Uniti PFL/PSA 801/polyester

|   | Maximum Load (N) | Average Load (N) | Comments/Observations |
|---|---|---|---|
| 1 | 11.254 | 7.497 | Cohesive failure |
| 2 | 10.476 | 6.484 | same |
| 3 | 8.741 | 6.985 | same |
| Mean | 10.157 | 6.989 | |
| Standard Deviation | 1.286 | 0.507 | |

TABLE 21

Peel resistance of PSA 801 adhesive with a cotton substrate.
601 Uniti PFL/PSA 801/cotton

|   | Maximum Load (N) | Average Load (N) | Comments/Observations |
|---|---|---|---|
| 1 | 7.26 | 6.337 | Cohesive failure |
| 2 | 7.37 | 6.224 | same |
| 3 | 7.573 | 6.47 | same |
| Mean | 7.401 | 6.344 | |
| Standard Deviation | 0.159 | 0.123 | |

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A crosslinkable pressure-sensitive adhesive, comprising:

a pressure sensitive crosslinkable adhesive, prepared by dissolving an acrylic adhesive polymer(s) in an organic solvent carrier with thorough mixing to produce a solution containing from about 20% to 60% solids; and at least one first polymer consisting of a mixture of monomers, which is the reaction product of a first ethylenically unsaturated monomer selected from the group consisting of an alkyl ester of acrylic acid, an alkyl ester of methacrylic acid, an ester of a carboxylic acid and an unsaturated alcohol and mixtures thereof; an optional second ethylenically unsaturated monomer selected from the group consisting of an olefin monomer, a vinylaromatic monomer and mixtures thereof; and from 1% to 10% by weight of the at least one first polymer of a polar monomer comprising a mixture of a third monomer comprising a monomer of the formula I and a fourth monomer comprising a monomer of the formula II:

$$H_2C=CH-L^1-OH \qquad \qquad I$$

$$H_2C=CR^1-L^2-CO_2H \qquad \qquad II$$

where $L_1$ and $L_2$ are independently selected from the group consisting of a direct bond and an alkylene group of formula $—(CH2)_m—[X—(CH2)_n]_o—$;

$R^1$ is H or methyl;

m and n are independently selected from the group consisting of 0, 1, 2, 3, and 4;

o is from 0 to 10; and

X is absent or is a group selected from the group consisting of $—CHR—$, $—O—$, $—S—$, $—CO_2—$, $—CO—$, $—CONH—$, $—NHCO—$, and $—NHCO_2—$, where R is lower alkyl;

and where the monomer of formula II comprises acrylic acid or methacrylic acid and where the fourth monomer further contains an ethylenically unsaturated non-functional monomer consisting of an olefin monomer selected from the group consisting of ethylene, propylene, and isobutylene;

a first multifunctional crosslinking agent having at least two epoxide rings or at least one epoxide ring and at least one aziridine ring; and a second multifunctional crosslinking agent having at least two isocyanate groups and the first multifunctional crosslinking agent and the second multifunctional crosslinking agent are used in a ratio of below 13:1;

where at least one of the isocyanate groups is an isocyanate-terminated oligomer of a diisocyanate and a dihydroxy compound or a diamine compound, and the oligomer contains from 2 to 10 diisocyanate-derived moieties;

where an amount of the monomer of formula I and the monomer of formula II are present in the at least one polymer so that the adhesive has a desired mole ratio of 10:1 of hydroxyl groups to carboxyl groups and the adhesive is used in a laminate comprising a first substrate layer and a second fabric layer laminated to a face of the first substrate layer such that the laminate is a label that does not leave a heat mark on a fabric after labeling.

2. The crosslinkable pressure-sensitive adhesive of claim 1, further comprising a second polymer;
said first polymer being the reaction product of the first ethylenically unsaturated monomer; the optional second ethylenically unsaturated monomer; and the monomer of formula I; and
said second polymer being a reaction product of the first ethylenically unsaturated monomer; the optional second ethylenically unsaturated monomer; and the monomer of formula II.

3. The crosslinkable pressure-sensitive adhesive of claim 1, wherein the second multifunctional crosslinking agent is selected from the group consisting of toluene diisocyanate, bis(4-isocyanato phenyl)methane, bis (4-isocyanato hexyl) methane, hexamethylenediisocyanate, tetramethylenediisocyanate, oligomers thereof, and mixtures thereof.

4. The crosslinkable pressure-sensitive adhesive of claim 1, wherein the monomer of formula I is a hydroxyalkyl acrylate monomer, vinyl alcohol, or allyl alcohol.

5. A crosslinkable pressure sensitive adhesive composition, comprising:
(A) from about 10 parts by weight to about 100 parts by weight of a first acrylic resin having from 1% to 10% by weight of the first acrylic resin of an ethylenically unsaturated monomer having a hydroxy substituent;
(B) from about 0 parts by weight to about 90 parts by weight of a second acrylic resin having from 1% to 10% by weight of the second acrylic resin of an ethylenically unsaturated monomer having a carboxyl group, wherein said parts by weight are based on the total weight of the first acrylic resin and the second acrylic resin in the composition,
(C) a polyisocyanate crosslinking agent derived from the reaction between a polyol and a diisocyanate; and
(D) a polyepoxy crosslinking agent which reacts by ring opening polymerization; and
where the polyepoxy crosslinking agent is added to the first and second acrylic resins prior to addition of the polyisocyanate crosslinking agent to reduce a reaction rate between the polyisocyanate crosslinking agent and the first and second acrylic resins;
wherein the crosslinkable pressure-sensitive adhesive contains the ethylenically unsaturated monomer having the hydroxy substituent and the ethylenically unsaturated monomer having the carboxyl group in an amount that produces a mole ratio of the hydroxyl substituent to the carboxyl group of about 10:1, and the crosslinkable pressure-sensitive adhesive is used in a laminate comprising a first substrate layer and a second fabric layer laminated to a face of the first substrate layer and the laminate comprises domed labels, beads, glitters, stones, holographic foil and/or circuitry embedded garment and battery powered attachments; and
where the crosslinkable pressure-sensitive adhesive is prepared by dissolving the first and second acrylic resins in an organic solvent carrier with thorough mixing to produce a solution containing from about 20% to 60% solids; and
where one or both of the first acrylic resin and the second acrylic resin further comprise non-functional monomer units, where the non-functional monomer units comprise an ethylenically unsaturated non-functional monomer consisting of an olefin monomer selected from the group consisting of ethylene, propylene, and isobutylene.

6. The crosslinkable pressure-sensitive adhesive of claim 5, wherein the crosslinkable pressure-sensitive adhesive comprises from about 10 parts by weight to about 90 parts by weight of the first acrylic resin; and from about 10 parts by weight to about 90 parts by weight of the second acrylic resin.

7. The crosslinkable pressure-sensitive adhesive of claim 6, wherein the ethylenically unsaturated monomer having a carboxyl group is selected from the group consisting of acrylic acid, methacrylic acid, itaconic acid, crotonic acid, maleic acid, fumaric acid, salts thereof, and mixtures thereof.

8. The crosslinkable pressure-sensitive adhesive of claim 6, wherein the ethylenically unsaturated monomer having a carboxyl group is selected from the group consisting of an ethylenically unsaturated monocarboxylic acid, an ethylenically unsaturated dicarboxylic acid, an ethylenically unsaturated anhydride of a dicarboxylic acid, an alkyl monoester of an ethylenically unsaturated dicarboxylic acid, and mixtures thereof.

9. The crosslinkable pressure-sensitive adhesive of claim 5, wherein the laminate is a label that does not leave a heat mark on a fabric after labeling.

10. The crosslinkable pressure-sensitive adhesive of claim 5, where the polyepoxy crosslinking agent is selected from the group consisting of epoxy modified bisphenol A, epichlorohydrin epoxy resins, phenol novolac epoxy resins, resorcinol epoxy resins, multi-epoxy functionalized glycidyl ether or glycidyl esters or amines, and elastomer modified epoxy resins.

11. The crosslinkable pressure-sensitive adhesive of claim 5, where the solution contains from about 25% to about 54% solids.

12. The crosslinkable pressure-sensitive adhesive of claim 1, where the solution contains from about 25% to about 54% solids.

* * * * *